United States Patent [19]

Imahori et al.

[11] 4,434,072

[45] Feb. 28, 1984

[54] LIQUID CRYSTAL COMPOSITION

[75] Inventors: Seiichi Imahori; Masaharu Kaneko, both of Kanagawa; Tetsuo Ozawa, Tokyo; Shuji Imazeki, Ibaraki; Akio Mukoh, Ibaraki; Mikio Sato, Ibaraki, all of Japan

[73] Assignees: Mitsubishi Chemical Industries, Ltd.; Hitachi Ltd., both of Tokyo, Japan

[21] Appl. No.: 340,547

[22] Filed: Jan. 18, 1982

[30] Foreign Application Priority Data

Jan. 17, 1981 [JP] Japan ................................. 56-5749
Jan. 17, 1981 [JP] Japan ................................. 56-5750

[51] Int. Cl.³ .......................... C09K 3/34; C02F 1/13
[52] U.S. Cl. .................................. 252/299.1; 350/349
[58] Field of Search ...................... 252/299.1; 350/349

[56] References Cited

U.S. PATENT DOCUMENTS

| 4,032,219 | 6/1977 | Constant et al. ................. 252/299.1 |
| 4,232,949 | 11/1980 | Huffman .......................... 252/299.1 |
| 4,232,950 | 11/1980 | Benham ............................ 252/299.1 |
| 4,360,447 | 11/1982 | Morimaka et al. ............... 252/299.1 |
| 4,363,743 | 12/1982 | Moeller et al. .................. 252/299.1 |

FOREIGN PATENT DOCUMENTS

| 25809 | 4/1981 | European Pat. Off. ......... 252/299.1 |
| 26004 | 4/1981 | European Pat. Off. ......... 252/299.1 |
| 38460 | 10/1981 | European Pat. Off. ......... 252/299.1 |
| 44893 | 2/1982 | European Pat. Off. ......... 252/299.1 |
| 3036853 | 4/1981 | Fed. Rep. of Germany ... 252/299.1 |
| 3038372 | 5/1981 | Fed. Rep. of Germany ... 252/299.1 |
| 55-127484 | 10/1980 | Japan ............................... 252/299.1 |
| 55-127485 | 10/1980 | Japan ............................... 252/299.1 |
| 2037803 | 7/1980 | United Kingdom ............. 252/299.1 |
| 2074182 | 10/1981 | United Kingdom ............. 252/299.1 |
| 2081736 | 2/1982 | United Kingdom ............. 252/299.1 |
| 2082196 | 3/1982 | United Kingdom ............. 252/299.1 |

OTHER PUBLICATIONS

Saeva, F. O., Xerox Discl. J., vol. 1, No. 9/10, pp. 61–62 (1976).

Cognard, J., et al., Mol. Cryst. Liq. Cryst., vol. 70, pp. 1–19 (1981).

*Primary Examiner*—Teddy S. Gron
*Attorney, Agent, or Firm*—Sughrue, Mion, Zinn, MacPeak & Seas

[57] ABSTRACT

A liquid crystal composition comprising a host liquid crystal And a pleochroic dye dissolved therein as a guest material is described, which is characterized in that the pleochroic dye contains an anthraquinone-based dye yielding a Magenta color and/or an orange color.

6 Claims, 3 Drawing Figures

LIQUID CRYSTAL COMPOSITION

FIELD OF THE INVENTION

The present invention relates to a liquid crystal composition, and more particularly, to a liquid crystal composition containing a specific dye for use in an electro-optic cell, which is interposed between two opposed electrode plates and permits the realization of good color displays utilizing the guest-host effect of liquid crystal.

BACKGROUND OF THE INVENTION

In a liquid crystal composition composed of a host liquid crystal and a pleochroic dye dissolved therein as a guest material, it is required for the pleochroic dye to show a high order parameter S (hereinafter sometimes referred to only as "S") in the host liquid crystal.

The order parameter S indicates the parallel degree of the absorption transition moment of dye molecules with respect to the direction of orientation of host liquid crystal molecules, and it is a factor determining a display contrast of a liquid crystal display element. With pleochroic dyes showing parallel dichroism, as the order parameter S approaches 1 which is the maximum value that it can theoretically take, the degree of residual color at whitened areas is reduced, and there can be obtained a light, high contrast, and sharp display. The order parameter S required for pleochroic dyes varies depending on the purpose for which a liquid crystal display element is used and the conditions under which the element is used, and it cannot to determined unconditionally. Usually, however, it is desirable for pleochroic dyes to show an order parameter of at least 0.7 in the vicinity of room temperature when they are used in a host liquid crystal which is suitable for the preparation of the ultimate element.

It is difficult to select pleochroic dyes having a higher S value while showing the desired hue, and it is also very difficult to anticipate such pleochroic dyes from the known dye materials.

Pleochroic dyes which have been developed include merocyanine-, azo- and anthraquinone-based dyes. It is said that anthraquinone-based dyes show generally high stability in a host liquid crystal compared with merocyanine- and azo-based dyes. However, anthraquinone-based dyes having a high S value and giving a Magenta or orange color as a single component have not yet been discovered.

SUMMARY OF THE INVENTION

An object of the invention is to provide pleochroic dyes which give a Magenta or orange color as a single component.

Another object of the invention is to provide pleochroic dyes having excellent stability.

A further object of the invention is to provide a liquid crystal composition exhibiting a high display contrast.

Still another object of the invention is to provide pleochroic dyes which yield a black color when used in combination with other dye.

The present invention relates to a liquid crystal composition comprising a host liquid crystal and a pleochroic dye dissolved therein as a guest material wherein the pleochroic dye contains an anthraquinone-based dye which yields a Magenta color and/or an orange color.

DETAILED DESCRIPTION OF THE INVENTION

Figure 1:
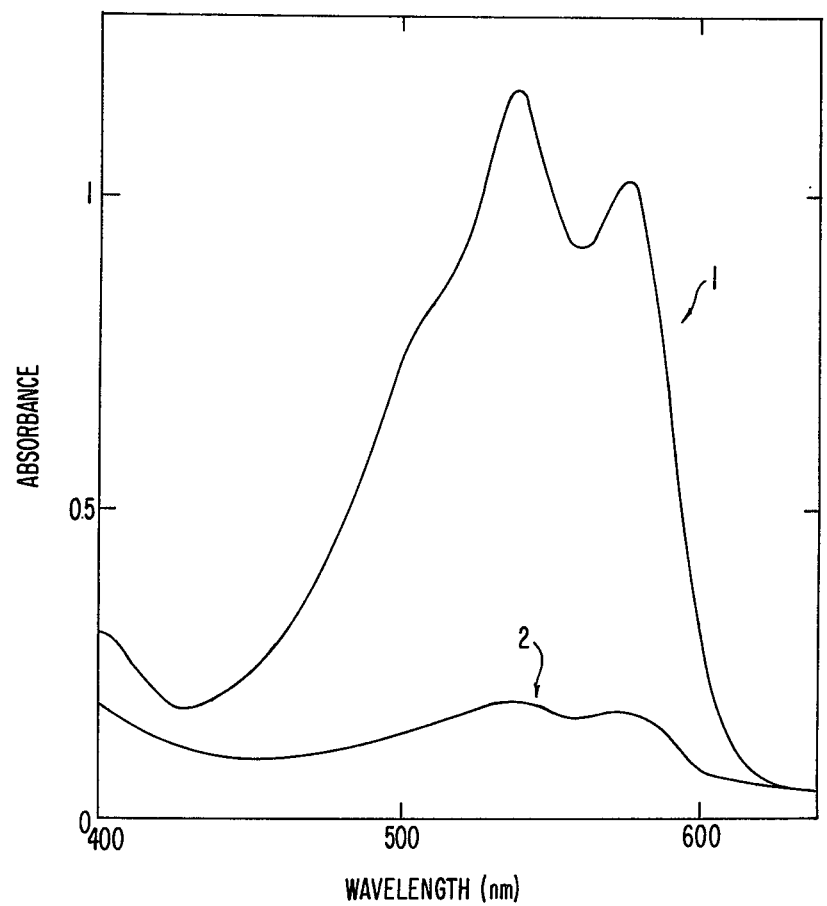
FIG. 1 shows the relation between absorbance and wavelength of the display element of Example 2, illustrating its spectral characteristics.

The liquid crystal composition of the invention is characterized in that the pleochroic dye used as a guest material contains an anthraquinone-based dye giving a Magenta color or an orange color as a single component.

Preferred examples of host liquid crystals which can be used in the invention are biphenyl- and phenylcyclohexane-based nematic liquid crystals. In particular, the phenylcyclohexane-based nematic liquid crystals are excellent in the response speed, and furthermore, the anisotropy in refractive index ($\Delta n$) thereof is small. The smaller the anisotropy in refractive index, the higher the contrast of the display element.

Typical examples of anthraquinone-based dyes which can be used in the invention are represented by the general formula (1):

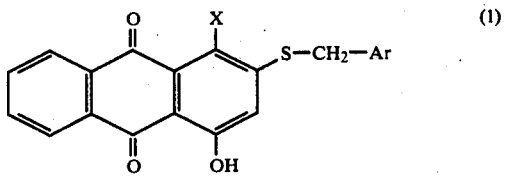

wherein X is an amino group or a hydroxyl group, and Ar is an aryl group which may be either substituted or not substituted.

Anthraquinone-based dyes in which the symbol X of the general formula (1) is an amino group yield a Magenta color, and those dyes in which X is a hydroxyl group yield an orange color.

These anthraquinone-based dyes can be used in combination with each other or other dyes. For example, the use of anthraquinone-based dyes yielding an orange color in combination with anthraquinone-based dyes yielding a Magenta color permits to obtain a deep red hue. It is also possible to obtain a black hue by using anthraquinone-based dyes of the invention yielding an orange in combination with dyes yielding a blue color. This is excellent in that a black color can be obtained using only two dye components.

As such dyes yielding a blue color, anthraquinone-based dyes represented by the general formula:

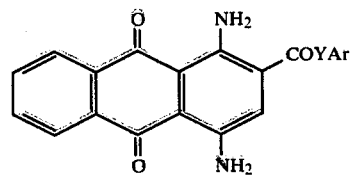

wherein Y is an oxygen atom, a sulfur atom, or —N— (R is a hydrogen atom or a lower alkyl group), and Ar is an aryl group which may be either substituted or not substituted, have already been developed as described in Japanese Patent Application No. 70152/80. Compounding these anthraquinone-based dyes yielding a blue color and anthraquinone-based dyes yielding an orange color of the invention in a ratio of 1.2/1.5 provides black pleochroic dyes which show a high S value in a host liquid crystal and excellent stability.

The Magenta color is one of the three primary colors in the subtractive mixing method and a very important hue in the preparation of colors, permitting the formation of all hues in combination with yellow and cyan colors.

Examples of substituents for the aryl group in the above general formula (1) include an alkyl group, an alkoxyalkyl group, an aryloxyalkyl group, a cycloalkyl group, an alkoxy group, an alkoxyalkoxy group, an arylalkoxy group, an acyloxy group, an alkoxycarbonyl group, an aryloxycarbonyl group, an aryl group, a halogen atom, a cyano group, and a nitro group. In particular, aryl groups which are substituted with straight or branched alkyl or alkoxy groups containing 3 to 8 carbon atoms are excellent in respect of the solubility in a host liquid crystal.

Incorporation of the group —S—CH$_2$—Ar at the 2-position of the general formula (1) is particularly significant for the realization of a high order parameter. The invention is based mainly on the findings that the incorporation of the group into the anthraquinone nucleus at the 2-position thereof is effective in improving dye characteristics. The use of the anthraquinone-based dyes represented by the general formula (1) in the guest-host liquid crystal display has not yet been reported.

Examples of the aryl groups indicated by the symbol Ar in the general formula (1) include unsubstituted aryl groups, e.g., a phenyl group, an α-naphthyl group, and a β-naphthyl group; aryl groups which are substituted with a methyl group, an ethyl group, and other straight or branched alkyl groups, e.g., a propyl group, a butyl group, a pentyl group, a hexyl group, a heptyl group, an octyl group, a nonyl group, a decyl group, a dodecyl group, a pentadecyl group, and an octadecyl group; aryl groups which are substituted with alkoxyalkyl groups, e.g., a methoxymethyl group, a propoxymethyl group, a butoxymethyl group, an octyloxymethyl group, a methoxyethyl group, and a butoxyethyl group; aryl groups which are substituted with aryloxyalkyl groups, e.g., a phenyloxymethyl group, and a 4-(n-butyl)phenyloxymethyl group; aryl groups which are substituted with cycloalkyl groups, e.g., a cyclohexyl group, a trans-4-propylcyclohexyl group, a trans-4-butylcyclohexyl group, a trans-4-pentylcyclohexyl group, a trans-4-hexylcyclohexyl group, and a trans-4-heptylcyclohexyl group; aryl groups which are substituted with alkoxy groups, e.g., a methoxy group, an ethoxy group, a propoxy group, a butoxy group, a pentyloxy group, a hexyloxy group, a heptyloxy group, an octyloxy group, a nonyloxy group, a decyloxy group, and an octadecyloxy group; aryl groups which are substituted with alkoxyalkoxy groups, e.g., a methoxyethoxy group and butoxyethoxy group; aryl groups which are substituted with arylalkoxy groups, e.g., a benzyloxy group, a 4-(n-butyl)benzyloxy group, and a 4-(n-butoxy)benzyloxy group; aryl groups which are substituted with acyloxy groups, e.g., an acetoxy group, a heptylcarbonyloxy group, a trans-4-pentylcyclohexylcarbonyloxy group, a benzoyloxy group, and a 4-(n-butyl)benzoyloxy group; aryl groups which are substituted with alkoxycarbonyl groups, e.g., a methoxycarbonyl group, a butoxycarbonyl group and an octyloxycarbonyl group; aryl groups which are substituted with aryloxycarbonyl groups, e.g., a phenoxycarbonyl group and a 4-(n-butyl)phenyloxycarbonyl group; aryl groups which are substituted with aryl groups, e.g., a phenyl group, a 4-butylphenyl group, a 4-pentylphenyl group, a 4-octylphenyl group, and a 4-butoxyphenyl group; aryl groups which are substituted with halogen atoms, e.g., a fluorine atom, a chlorine atom and a bromine atom; and aryl groups which are substituted with a cyano group and a nitro group.

The anthraquinone-based dyes represented by the general formula (1) can be prepared, for example, by reacting the compounds represented by the general formula (2):

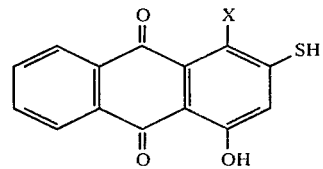

with the compounds represented by the general formula (3):

YCH$_2$Ar wherein Y is a halogen atom or an arylsulfonyloxy group, and Ar is the same as defined in the general formula (1), in the presence of an acid binder, e.g., alkali carbonate.

The nematic liquid crystal as used herein can be selected from a wide variety of nematic liquid crystals, as long as they show a nematic state in an operating temperature range. Addition of optically active substances as described hereinafter to such nematic liquid crystals can bring about a cholesteric state.

Examples of such nematic liquid crystals include the substances listed in Table 1 and the derivatives thereof.

TABLE 1

| No. | Type | Example Formula |
|---|---|---|
| 1 | Cyclohexylcyclohexane series |  |

TABLE 1-continued

| No. | Type | Example Formula |
|---|---|---|
| 2 | Phenylcyclohexane series | R'—(H)—⟨phenyl⟩—X' |
| 3 | Biphenyl series | R'—⟨phenyl⟩—⟨phenyl⟩—X' |
| 4 | Terphenyl series | R'—⟨phenyl⟩—⟨phenyl⟩—⟨phenyl⟩—X' |
| 5 | Cyclohexylcyclohexanoate series | R'—(H)—COO—(H)—X' |
| 6 | Phenylcyclohexyl carboxylate series | R'—(H)—COO—⟨phenyl⟩—X' |
| 7 | Ester series | R'—⟨phenyl⟩—COO—⟨phenyl⟩—X' |
| 8 | Diester series | R'—⟨phenyl⟩—COO—⟨phenyl⟩—COO—⟨phenyl⟩—X'<br>X'—⟨phenyl⟩—COO—⟨phenyl⟩—COO—⟨phenyl⟩—R' |
| 9 | Biphenylcyclohexyl carboxylate series | R'—(H)—COO—⟨phenyl⟩—⟨phenyl⟩—X' |
| 10 | Biphenylester series | R'—⟨phenyl⟩—⟨phenyl⟩—COO—⟨phenyl⟩—X'<br>X'—⟨phenyl⟩—⟨phenyl⟩—COO—⟨phenyl⟩—R' |
| 11 | Thioester series | R'—⟨phenyl⟩—COS—⟨phenyl⟩—X' |
| 12 | Schiff base series | R'—⟨phenyl⟩—CH=N—⟨phenyl⟩—X' |

TABLE 1-continued

| No. | Type | Example Formula |
|---|---|---|
| | | X'—⟨phenyl⟩—CH=N—⟨phenyl⟩—R' |
| 13 | Pyrimidine series | R'—⟨phenyl⟩—CH=CH—⟨pyrimidine⟩—X' |
| | | R'—CH=CH—⟨pyrimidine⟩—⟨phenyl⟩—X' |
| | | R'—⟨phenyl⟩—C(=N)—⟨pyrazine⟩—X' |
| | | R'—⟨pyrimidine⟩—CH=CH—⟨phenyl⟩—X' |
| 14 | Dioxane series | R'—⟨dioxane⟩—⟨phenyl⟩—X' |
| 15 | Cyclohexyl methyl ether series | R'—⟨H-cyclohexyl⟩—CH$_2$O—⟨phenyl⟩—X' |
| | | R'—⟨H-cyclohexyl⟩—CH$_2$O—⟨phenyl⟩—⟨phenyl⟩—X' |
| 16 | Cinnamonitrile series | R'—⟨H-cyclohexyl⟩—⟨phenyl⟩—CH=CH—X' |

In Table 1, R' represents an alkyl group or an alkoxy group, and X' represents a nitro group, a cyano group or a halogen atom.

The liquid crystals shown in Table 1 all have positive dielectric anisotropy. In addition, known ester-, azoxy-, azo-, Schiff-, pyrimidine-, diester- and biphenylester-based liquid crystals having negative dielectric anisotropy can be used in admixture with liquid crystals having positive dielectric anisotropy, provided that the anisotropy of the resulting mixture is positive. Furthermore, liquid crystals having negative dielectric anisotropy can of course be used per se by employing a suitable cell construction and driving method.

As the host liquid crystal material as used herein, any of the liquid crystals listed in Table 1 and mixtures thereof can be used. It has been found that a liquid crystal material composed of the following four liquid crystal compounds:

| | % by weight |
|---|---|
| $C_3H_7$—⟨H-cyclohexyl⟩—⟨phenyl⟩—CN | 38.4 |
| $C_5H_{11}$—⟨H-cyclohexyl⟩—⟨phenyl⟩—CN | 34.2 |
| $C_7H_{15}$—⟨H-cyclohexyl⟩—⟨phenyl⟩—CN | 18.1 |

-continued

| | % by weight |
|---|---|
| 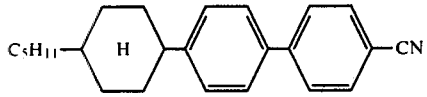 | 9.3 | which is sold under the trade name of ZLI-1132 by E. M. Merck & Co., and a liquid crystal material composed of the following four liquid crystal compounds:

| | % by weight |
|---|---|
| 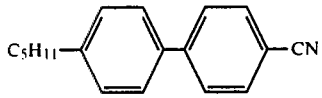 | 51 |
| 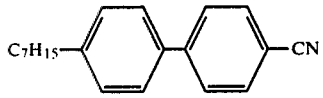 | 25 |
| 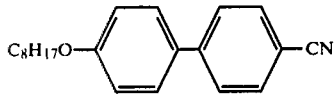 | 16 |
| 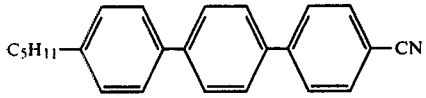 | 8 | which is sold under the trade name of E-7 by British Drug House Co. are particularly useful in the invention.

Examples of optically active substances which can be used in the invention include chiral nematic compounds prepared, for example, by introducing an optically active group, such as a 2-methylbutyl group, a 3-methylbutoxy group, a 3-methylpentyl group, a 3-methylpentoxy group, a 4-methylhexyl group, and a 4-methylhexyloxy group, into a nematic liquid crystal compound. Of course, optically active substances, such as alcohol derivatives, e.g., l-menthol and d-borneol, as disclosed in Japanese Patent Application (OPI) No. 45546/76 (the term "OPI" as used herein refers to a "published unexamined Japanese patent application"), ketone derivatives, e.g., d-camphor and 3-methylcyclohexane, carboxylic acid derivatives, e.g., d-citronellic acid and l-camphoric acid, aldehyde derivatives, e.g., d-citronellal, alkene derivatives, e.g., d-linonene, amines, amides, and nitrile derivatives can be used.

As cells in which the liquid crystal composition of the invention is used, known cells for liquid crystal displays can be used. That is, cells which are generally used are those in which transparent electrodes having an optional pattern are provided on two glass substrates at least one of which is transparent and the two glass substrates are opposed with the electrode planes facing each other using an appropriate spacer to keep the substrates parallel to each other. The spacer determines the gap of the cell. From a practical point of view, the cell gap is preferably from 3 to 100 μm, and more preferably from 5 to 50 μm.

Hereinafter examples of pleochroic anthraquinone-based dyes yielding a Magenta color or an orange color which are used in the liquid crystal compositions of the invention, and liquid crystal compositions containing such pleochroic dyes will be explained in detail with reference to the following examples.

EXAMPLE 1

Examples of anthraquinone-based pleochroic dyes which can be used in the invention are set forth in Tables 2 and 3 along with their maximum absorption wavelengths and order parameters.

TABLE 2

| No. | —Ar | Maximum Absorption Wavelength (nm) | Order Parameter |
|---|---|---|---|
| 1 | 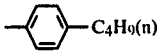 | 536 | 0.70 |
| 2 | 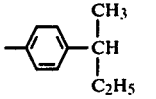—C$_4$H$_9$(n) | 536 | 0.71 |
| 3 | 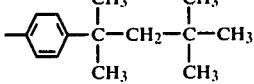—CH(CH$_3$)(C$_2$H$_5$) | 536 | 0.70 |
| 4 | 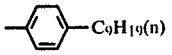—C(CH$_3$)$_2$—CH$_2$—C(CH$_3$)$_3$ | 537 | 0.72 |
| 5 | 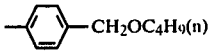—C$_9$H$_{19}$(n) | 537 | 0.71 |
| 6 | 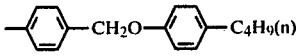—CH$_2$OC$_4$H$_9$(n) | 537 | 0.70 |
| 7 | 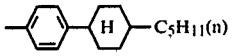—CH$_2$O—<img>—C$_4$H$_9$(n) | 536 | 0.72 |
| 8 | 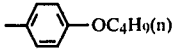—H—C$_5$H$_{11}$(n) | 536 | 0.74 |
| 9 | 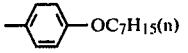—OC$_4$H$_9$(n) | 534 | 0.72 |
| 10 | 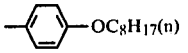—OC$_7$H$_{15}$(n) | 537 | 0.73 |
| 11 | 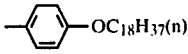—OC$_8$H$_{17}$(n) | 537 | 0.73 |
| 12 | —<img>—OC$_{18}$H$_{37}$(n) | 536 | 0.72 |
| 13 | 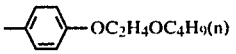—OC$_2$H$_4$OC$_4$H$_9$(n) | 536 | 0.72 |

TABLE 2-continued

Structure: 1-amino-4-hydroxyanthraquinone-2-S—CH$_2$Ar

| No. | —Ar | Maximum Absorption Wavelength (nm) | Order Parameter |
|---|---|---|---|
| 14 | —C$_6$H$_4$—OCH$_2$—C$_6$H$_4$—OC$_2$H$_9$ | 537 | 0.73 |
| 15 | —C$_6$H$_4$—OCOC$_7$H$_{15}$(n) | 537 | 0.72 |
| 16 | —C$_6$H$_4$—OCO—C$_6$H$_{10}$(H)—C$_5$H$_{11}$(n) | 537 | 0.74 |
| 17 | —C$_6$H$_4$—COOCH$_3$ | 535 | 0.72 |
| 18 | —C$_6$H$_4$—COO—C$_6$H$_4$—C$_4$H$_9$(n) | 535 | 0.74 |
| 19 | —C$_6$H$_4$—C$_6$H$_4$—C$_5$H$_{11}$(n) | 537 | 0.74 |
| 20 | —C$_6$H$_4$—Cl | 536 | 0.70 |
| 21 | —C$_6$H$_4$—CN | 536 | 0.70 |
| 22 | —C$_6$H$_4$—NO$_2$ | 536 | 0.70 |

TABLE 3

Structure: 1,4-dihydroxyanthraquinone-2-S—CH$_2$Ar

| No. | —Ar | Maximum Absorption Wavelength (nm) | Order Parameter |
|---|---|---|---|
| 1 | —C$_6$H$_5$ | 503 | 0.70 |
| 2 | —C$_6$H$_4$—C$_4$H$_9$(n) | 504 | 0.70 |
| 3 | —C$_6$H$_4$—CH(CH$_3$)(C$_2$H$_5$) | 504 | 0.70 |
| 4 | —C$_6$H$_4$—C(CH$_3$)$_2$CH$_2$C(CH$_3$)$_3$ | 503 | 0.72 |
| 5 | —C$_6$H$_4$—C$_9$H$_{19}$(n) | 504 | 0.71 |
| 6 | —C$_6$H$_4$—CH$_2$OC$_4$H$_9$(n) | 504 | 0.70 |
| 7 | —C$_6$H$_4$—CH$_2$O—C$_6$H$_4$—C$_4$H$_9$(n) | 503 | 0.71 |
| 8 | —C$_6$H$_4$—C$_6$H$_{10}$(H)—C$_5$H$_{11}$(n) | 502 | 0.73 |
| 9 | —C$_6$H$_4$—OC$_4$H$_9$(n) | 504 | 0.71 |
| 10 | —C$_6$H$_4$—OC$_7$H$_{15}$(n) | 503 | 0.72 |
| 11 | —C$_6$H$_4$—OC$_8$H$_{17}$(n) | 500 | 0.73 |
| 12 | —C$_6$H$_4$—OC$_{18}$H$_{37}$(n) | 502 | 0.72 |
| 13 | —C$_6$H$_4$—OC$_2$H$_4$OC$_4$H$_9$(n) | 503 | 0.70 |
| 14 | —C$_6$H$_4$—OCH$_2$—C$_6$H$_4$—OC$_4$H$_9$ | 503 | 0.70 |
| 15 | —C$_6$H$_4$—OCOC$_7$H$_{15}$(n) | 504 | 0.71 |
| 16 | —C$_6$H$_4$—OCO—C$_6$H$_{10}$(H)—C$_5$H$_{11}$(n) | 503 | 0.72 |
| 17 | —C$_6$H$_4$—COOCH$_3$ | 504 | 0.72 |
| 18 | —C$_6$H$_4$—COO—C$_6$H$_4$—C$_4$H$_9$(n) | 501 | 0.74 |
| 19 | —C$_6$H$_4$—C$_6$H$_4$—C$_5$H$_{11}$(n) | 502 | 0.74 |
| 20 | —C$_6$H$_4$—Cl | 504 | 0.70 |

TABLE 3-continued

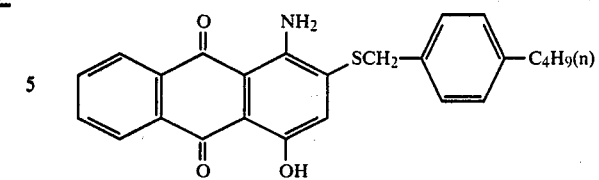

| No. | —Ar | Maximum Absorption Wavelength (nm) | Order Parameter |
|---|---|---|---|
| 21 | —⟨⟩—CN | 504 | 0.70 |
| 22 | —⟨⟩—NO₂ | 504 | 0.70 |

The maximum absorption wavelength and order parameter of each dye shown in Tables 2 and 3 were measured as follows:

To the above-described phenylcyclohexane-based mixed liquid crystal sold under the trade name of ZLI-1132 was added one of the dyes shown in Tables 2 and 3 as a pleochroic dye. The resulting mixture was heated to at least 70° C., well stirred in the state that the liquid crystal became an isotropic liquid, and thereafter, was allowed to cool. This procedure was repeated until the dye was dissolved in the liquid crystal.

The thus-prepared liquid crystal composition was sealed in a cell with a gap of 10 to 100 μm comprising two glass substrates having transparent electrodes wherein the surface of the glass substrate coming into contact with the liquid crystal was coated with a polyamide resin, and after hardening of the polyamide resin coating, was subjected to a rubbing treatment to achieve homogeneous orientation. In the cell subjected to the orientation treatment, the liquid crystal composition took on a homogeneous orientation state when no voltage was applied across the electrodes, and the dye molecules also had the same orientation following the host liquid crystal.

With the thus-prepared guest-host cell, the absorption spectrum was measured using a polarized light in parallel to the direction of orientation of liquid crystal molecules and a polarized light perpendicular to the direction of orientation, and the absorbances $A_{||}$ and $A_{\perp}$ of the dye to the polarized lights and the maximum absorption wavelength were determined. In determining the absorbance of the dye, corrections were made with respect to the absorption by the host liquid crystal and the reflection loss of the cell. The order parameter S was determined by the following equation:

$$S = \frac{A_{||} - A_{\perp}}{2A_{\perp} + A_{||}}$$

EXAMPLE 2

To the same liquid crystal as used in Example 1 was added Dye No. 2 shown in Table 2, having the formula:

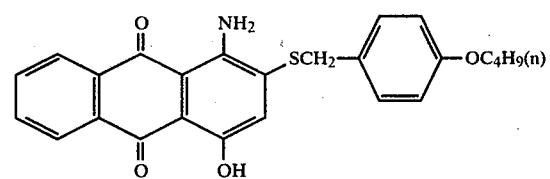

in an amount of 1.50% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof was measured in the same manner as in Example 1. The spectrum is shown in FIG. 1 wherein Curves 1 and 2 indicate $A_{||}$ and $A_{\perp}$, respectively. The maximum absorption wavelength in the visible light region was 536 nm, and $A_{||}$ and $A_{\perp}$ at the maximum absorption wavelength were 1.132 and 0.138, respectively. Thus, the order parameter of the dye was 0.71. The melting point of the dye was 126° to 127° C.

EXAMPLE 3

To the same liquid crystal as used in Example 1 was added Dye No. 9 shown in Table 2, having the formula:

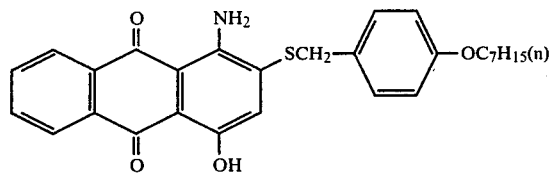

in an amount of 1.07% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof was measured in the same manner as in Example 1. The order parameter S of the dye was calculated and found to be 0.72. The melting point of the dye was 117° to 118° C.

EXAMPLE 4

To the same liquid crystal as used in Example 1 was added Dye No. 10 shown in Table 2, having the formula:

in an amount of 0.97% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof

EXAMPLE 5

To the same liquid crystal was used in Example 1 was added Dye No. 11 shown in Table 2, having the formula:

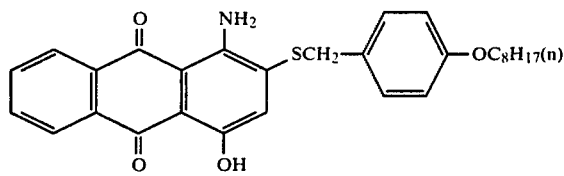

in an amount of 1.13% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof was measured in the same manner as in Example 1. The order parameter S of the dye was calculated and found to be 0.73. The melting point of the dye was 116° to 117° C.

EXAMPLE 6

To the same liquid crystal as used in Example 1 was added Dye No. 20 shown in Table 2, having the formula:

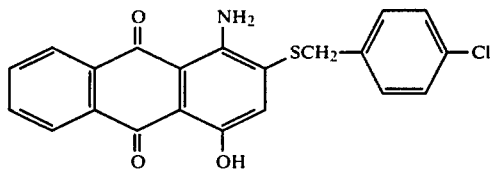

in an amount of 1.30% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof was measured in the same manner as in Example 1. The order parameter S of the dye was calculated and found to be 0.70. The melting point of the dye was 185° to 186° C.

EXAMPLE 7

To the same liquid crystal as used in Example 1 was added Dye No. 9 shown in Table 3, having the formula:

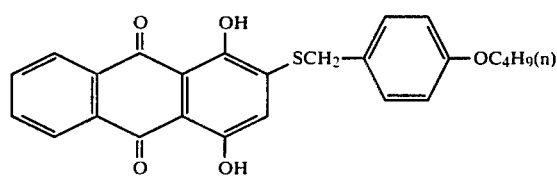

in an amount of 0.91% by weight based on the weight of the liquid crystal to prepare a liquid crystal composition.

Figure 2:
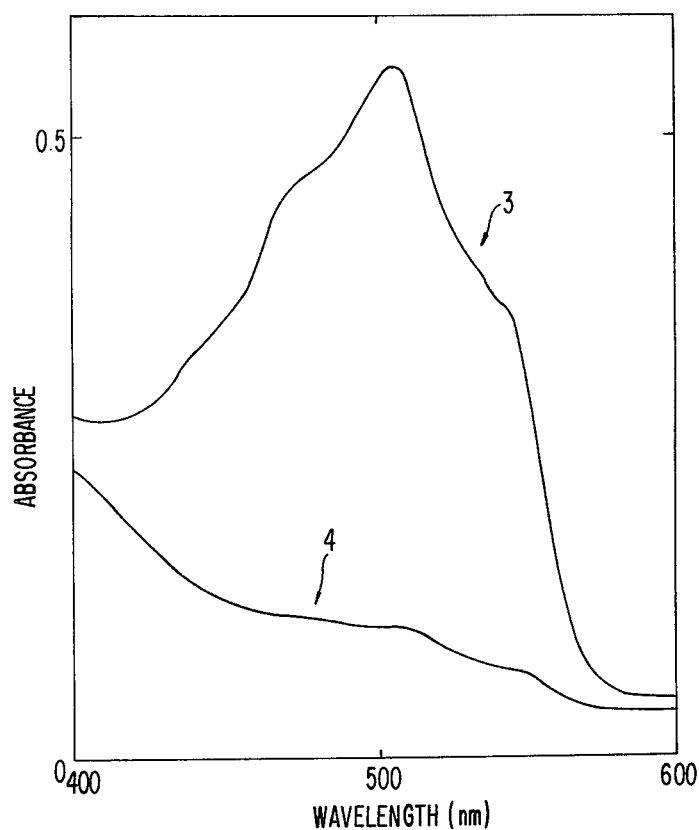
FIG. 2 shows the relation between absorbance and wavelength of the display element of Example 7, illustrating its spectral characteristics.

The thus-prepared liquid crystal composition was sealed in the same cell as used in Example 1 (substrate gap: about 10 μm), and the absorption spectrum thereof was measured in the same manner as in Example 1. The absorption spectrum is shown in FIG. 2 wherein Curves 3 and 4 indicate $A_\parallel$ and $A_\perp$, respectively. The maximum absorption wavelength in the visible light region was 504 nm, and $A_\parallel$ and $A_\perp$ at the maximum absorption wavelength were 0.494 and 0.060, respectively. Thus, the order parameter S of the dye was 0.71. The melting point of the dye was 137° to 138° C.

EXAMPLE 8

To the same liquid crystal as used in Example 1 was added Dye No. 11 shown in Table 3, having the formula:

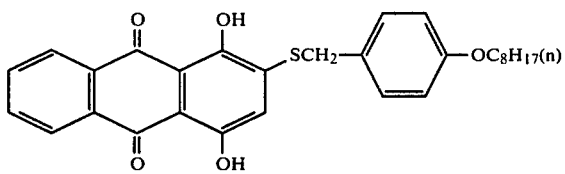

in an amount of 1.07% by weight based on the weight of the liquid crystal to prepare a liquid crystal composition.

The thus-prepared liquid crystal composition was sealed in the same cell as used in Example 1 (substrate gap: about 10 μm), and the absorption spectrum thereof was measured in the same manner as in Example 1. The order parameter S of the dye was calculated and found to be 0.73. The melting point of the dye was 136° to 137° C.

EXAMPLE 9

In order to obtain data on the practical stability of the dyes as used in the liquid crystal compositions of the invention, an accelerated deterioration test was conducted.

Each liquid crystal composition prepared in Examples 2 to 6 was sealed in the same cell as used in Example 1 and was allowed to stand for about 100 hours in a sunshine weather meter to trace the recuction ratio of absorbance. For comparison, typical known dyes were each sealed in the same cell as used above and were each subjected to the same accelerated deterioration test as above. A light source for the sunshine weather meter was a carbon arc lamp, and the accelerated deterioration test was performed under the conditions of a temperature of about 50° C. and a humidity of about 90%. In the accelerated deterioration test, the cell was protected by an ultraviolet ray-cutting filter.

Figure 3:
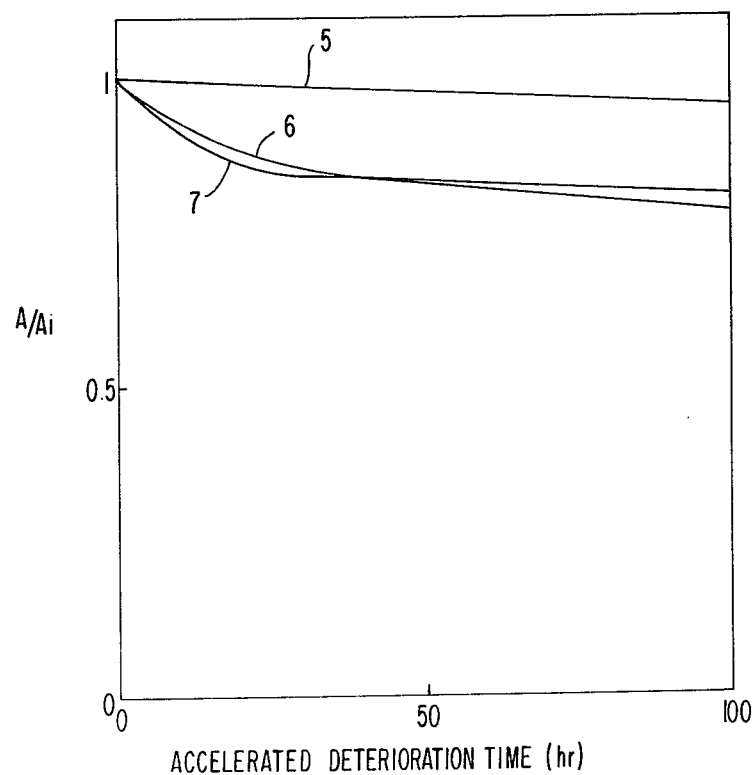
FIG. 3 shows changes in absorbance with a lapse of time of display elements containing an anthraquinone-based dye of the invention and a known typical dichromatic dye.

The results of the accelerated deterioration test are shown in FIG. 3, wherein the ratio of the absorbance A at a predetermined time to the initial absorbance Ai (A/Ai) is indicated as ordinate and the accelerated deterioration time as abscissa. In FIG. 3, Curves 5, 6 and 7 indicate changes in absorbance of cells containing the dye of Example 2, an azo dye having the formula:

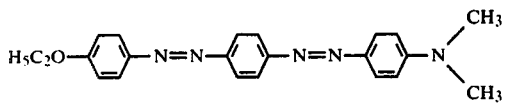

(hereinafter referred to as "Dye A"), and an azo dye having the formula:

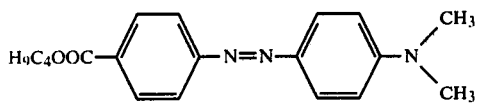

(hereinafter referred to as "Dye B"), respectively.

It can be seen from FIG. 3 that the dye of the invention is much more stable than the prior art dyes exemplified by Dyes A and B.

The substantially same results as obtained in the use of the dye of Example 2 were obtained in the use of the dyes in Examples 3 to 8.

EXAMPLE 10

To the same liquid crystal as used in Example 1 were added Dye No. 2 shown in Table 2 and Dye No. 9 shown in Table 3 in an amount of 1.5% by weight and 1.2% by weight, respectively, based on the weight of the liquid crystal to prepare a liquid crystal composition.

The thus-prepared liquid crystal composition was sealed in the same cell as used in Example 1 (substrate gap: about 10 μm), and the liquid crystal layer yielded a deep red color.

EXAMPLE 11

To the same liquid crystal as used in Example 1 were added Dye No. 9 shown in Table 3 and a dye yielding a blue color, having the formula:

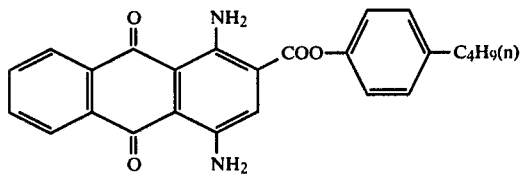

in an amount of 1.5% by weight and 1.2% by weight, respectively, based on the weight of the liquid crystal to prepare a liquid crystal composition.

The thus-prepared liquid crystal composition was sealed in the same cell as used in Example 1 (substrate gap: about 10 μm), and the liquid crystal layer showed a black color.

While the invention has been described in detail and with reference to specific embodiments thereof, it will be apparent to one skilled in the art that various changes and modifications can be made therein without departing from the spirit and scope thereof.

What is claimed is:

1. In a liquid crystal composition comprising a host liquid crystal and a pleochroic dye dissolved therein as a guest material, the improvement wherein the pleochroic dye contains an anthraquinone-based dye yielding a magenta color or an orange color, said anthraquinone-based dye being represented by the general formula:

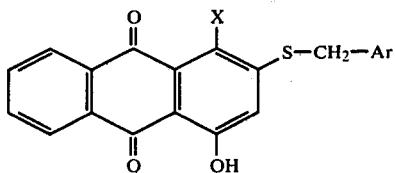

wherein X is an amino group or a hydroxyl group, and Ar is an aryl group which may be substituted by an alkyl group, an alkoxyalkyl group, an aryloxyalkyl group, a cycloalkyl group, an alkoxy group, an alkoxyalkoxy group, an arylalkoxy group, an acyloxy group, an alkoxycarbonyl group, an aryloxycarbonyl group, an aryl group, a halogen atom, a cyano group or a nitro group.

2. The composition as claimed in claim 1, wherein the aryl group is a group represented by the formula:

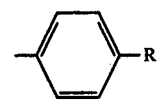

wherein R contains 3 to 8 carbon atoms and is a straight or branched alkyl or alkoxy group.

3. The composition as claimed in claim 2, wherein the symbol X of the general formula is an amino group.

4. In a liquid crystal composition comprising a host liquid crystal and a pleochroic dye dissolved therein as a guest material, the improvement wherein the host liquid crystal is a bisphenyl- or phenylcyclohexane-based nematic liquid crystal and the pleochroic dye contains an anthraquinone-based dye yielding a magenta color or an orange color, said anthraquinone-based dye being represented by the general formula:

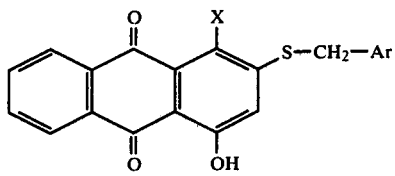

wherein X is an amino group or a hydroxyl group, and Ar is an aryl group which may be either substituted or not substituted.

5. The composition as claimed in claim 4, wherein the pleochroic dye comprises an anthraquinone-based dye yielding an orange color and an anthraquinone-based dye yielding a blue color, and gives a black color.

6. The composition as claimed in claim 5, wherein the anthraquinone-based dye yielding an orange color is represented by the general formula:

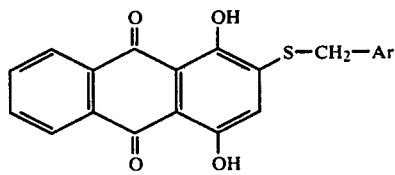

wherein Ar is an aryl group which may be either substituted or not substituted, and the anthraquinone-based dye yielding a blue color is represented by the general formula:
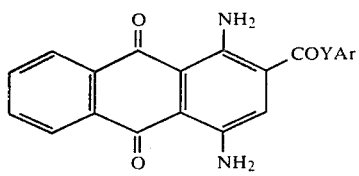
wherein Y is an oxygen atom, a sulfur atom, or a group —NR— wherein R is a hydrogen atom or a lower alkyl group, and Ar is the same as defined above.
* * * * *